Sept. 28, 1965 R. C. PAULSEN ETAL 3,209,334

NON-DESTRUCTIVE READ-OUT MEMORY ELEMENT

Filed March 6, 1961 3 Sheets-Sheet 1

INVENTORS
ROBERT C. PAULSEN
PHILIP J. LIMA
BY
ATTORNEY

NON-DESTRUCTIVE READ-OUT MEMORY ELEMENT

Filed March 6, 1961 3 Sheets-Sheet 2

United States Patent Office 3,209,334

Patented Sept. 28, 1965

3,209,334
NON-DESTRUCTIVE READ-OUT MEMORY ELEMENT

Robert C. Paulsen, Poughkeepsie, and Philip J. Lima, Hopewell Junction, N.Y., assignors to International Business Machines Corporation, New York, N.Y., a corporation of New York Filed Mar. 6, 1961, Ser. No. 93,444
3 Claims. (Cl. 340—174)

The present invention relates generally to information storage systems, and more particularly to magnetic storage elements, and systems employing the same, wherein non-destructive readout of information is obtained.

This invention is directed to magnetic storage systems wherein non-destructive reading of information stored in an element is attained by temporarily and reversibly altering the magnetic condition of the element or a portion thereof and sensing the effect of the change. This type of reading is possible where the effects of such temporary alterations differ for elements which have magnetic states representing different information, and where the alterations are such that the elements will substantially re-attain their initial information representing states following the alterations, without any assistance. An example of a magnetic element adapted for non-destructive readout is found in the prior and copending application, Serial No. 64,607 (now U.S. Patent 3,023,400) of R. R. Booth, filed on October 24, 1960, and assigned to the assignee hereof. The element disclosed therein is a multiapertured magnetic element in which stored binary information is represented by predetermined magnetic flux patterns around its several apertures. Non-destructive readout of the stored information is obtained by temporarily altering the magnetic flux around the central aperture, and sensing the voltage induced in an output winding by the alteration. The flux patterns representing the two kinds of binary information are such that upon alteration the induced voltage is of one polarity for a stored binary 1 and of opposite polarity for a stored binary zero.

It is the primary object of this invention to improve the operation of a non-destructive readout magnetic element of the type just described by enhancing the voltage induced upon temporary alteration of a predetermined one of the information representing states.

A further object of the invention is to adapt a non-destructive readout element of the type described to indicate the value of stored information by the magnitude of induced voltage rather than by the polarity thereof.

More specifically, it is an object of this invention to provide, in a non-destructive readout magnetic element which indicates stored information by sensible effects attending reversible flux alterations, bias means for increasing the magnitude of the effects attending alteration of flux representing one information state while decreasing the magnitude of the effects attending alteration of flux representing the other information state.

The foregoing and other objects, features and advantages of the invention will be apparent from the following more particular description of preferred embodiments of the invention, as illustrated in the accompanying drawings.

Figure 1:
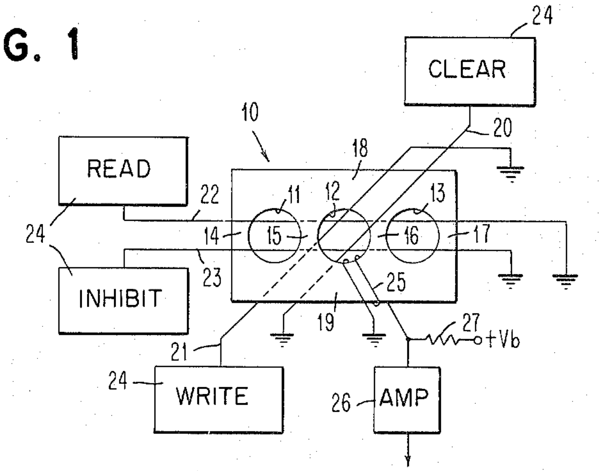
FIGURE 1 is a schematic illustration of a nondestructive readout magnetic element and operating circuitry therefor, provided in accordance with this invention.

Referring now in detail to the drawings, there is shown in FIGURE 1 a non-destructive readout magnetic element 10 of the type to which the present invention may be applied. The element 10 is fabricated from magnetic material, for example, magnesium-manganese ferrite or manganese-zinc ferrite, which exhibits substantial magnetic remanence and which has relatively low coercive force. The element 10 has aligned apertures 11, 12 and 13 therein dividing it into four parallel legs 14, 15, 16 and 17 of equal minimum cross-sectional area and into two perpendicularly disposed legs 18 and 19, the minimum cross-sectional areas of which are preferably at least twice that of legs 14–17. The element 10 is provided with a CLEAR winding 20 which passes through the center hole 12. A WRITE winding 21 also passes through the center hole 12. A READ winding 22 and an INHIBIT winding 23 pass through the holes 11 and 13 as shown in FIGURE 1. Each of the windings 20, 21, 22 and 23 is coupled to a separate driver 24, which may be any suitable pulse generator. The details of the drivers are not shown or described herein since they are well known in the art. The several drivers 24 are labeled in FIGURE 1 to indicate the functions they perform.

The multipath magnetic element 10 also has coupled thereto a SENSE winding 25 which is wound one or more times through the center aperture 12. An amplifier 26, of any suitable design, is coupled to the SENSE line 25 to amplify voltages which may be induced therein during operation of the element.

Figure 2:
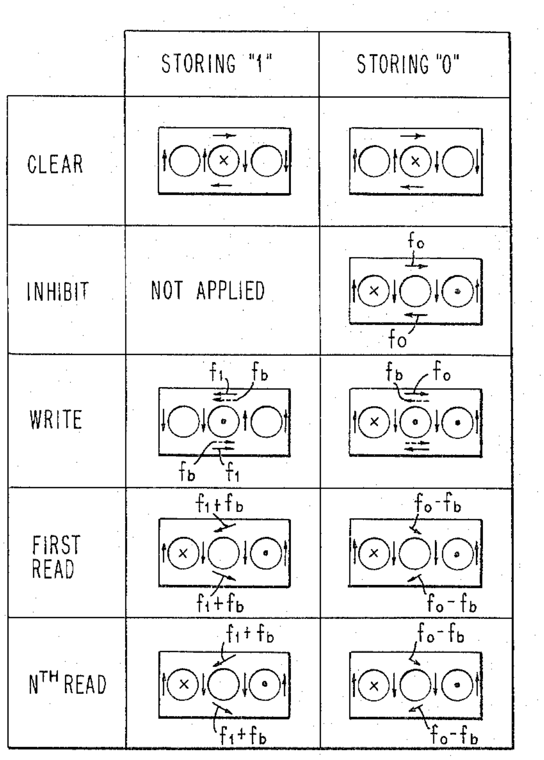
FIGURE 2 is a diagrammatic chart illustrating the flux patterns created in the element for each step of a storing and reading cycle.
Figure 3:
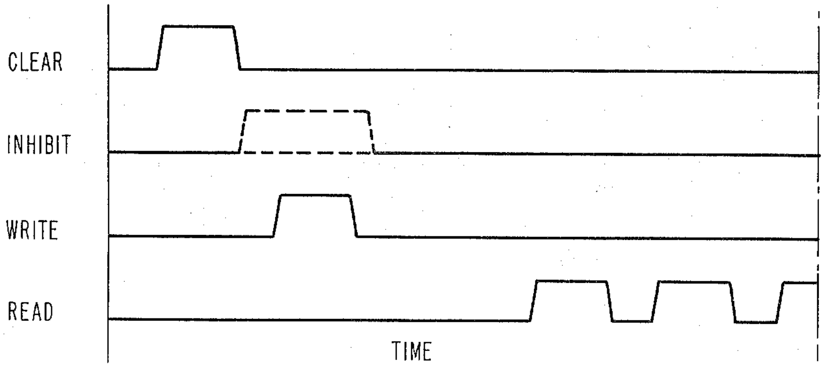
FIGURE 3 is a timing diagram illustrating the relative timing of the several input pulses to which the element is subjected.

The operation of the element 10 is illustrated by the several flux diagrams in the chart of FIGURE 2 and the pulse timing diagram of FIGURE 3. Referring to FIGURE 2, it will be seen that each index point on the chart contains a schematic illustration of an element 10 having a plurality of arrows thereon. The arrows represent the direction of flux through the several legs of the element for the conditions indicated. It will also be observed that in each diagram, certain of the apertures in the element have a black dot or an X therein. These symbols represent the direction of current flow through the apertures during the several operations. In accordance with conventional practice, a dot represents current flow out of the plane of the paper while an X represents current flow into the plane of the paper.

Referring to FIGURE 2, a typical cycle of operation of the non-destructive readout element 10 is commenced by clearing the element of previously stored information. This is accomplished by activating the CLEAR driver to produce a relatively intense current flow in winding 20 down through aperture 12. The field produced by this current establishes a clockwise flow of flux around the center aperture in all legs of the element. When the CLEAR pulse terminates, the remanent flux pattern indicated by the arrows, remains. Following the CLEAR operation, either a binary 1 or a binary 0 may be written in the element 10. If a binary 1 is to be written, no inhibit current is applied, and the next operation to which the element is subjected is the WRITE operation. As indicated in FIGURE 2, activation of the WRITE driver produces an intensie current flow upwardly through aperture 12 via winding 21. The field produced thereby switches the flux in all legs to produce a counter-clockwise flow around the center aperture 12 as indicated by the flux diagram. This pattern represents a stored but as yet unread binary 1.

The readout of element 10 may occur at any time following completion of a WRITE operation. Reading is accomplished by activating the READ driver to produce a pulse of current down through aperture 11 and up through aperture 13. As shown in the flux diagram corresponding to the first read of a stored binary 1, the fields set up by this current cause the flux in legs 14 and 16 to be reversed. The consequent change in net flux surrounding aperture 12 induces an output voltage in sense winding 25. Subsequent readout operations, each accomplished by gain activating the READ driver as just described, do not produce any flux reversal in the vertical legs 14, 15, 16 and 17 of the element 10, but they do nevertheless induce output voltages in the winding 25 of lesser magnitude but equal polarity to that induced by the first readout. It appears that the writing operation establishes in the upper and lower horizontal legs 18 and 19 a remanent flux which remains through the reading operations and until the element is cleared. This flux is represented by the horizontal arrows $f_1$ in the diagrams corresponding to the WRITE row and STORING "1" column of FIG. 2. Upon the first readout, the density of the flux $f_1$ may be reduced, but it is not destroyed. Upon subsequent readouts, the field produced by current in winding 22 temporarily and revisably alters this flux, thereby inducing a voltage in sense winding 25, but the flux $f_1$ reverts after each readout to its initial state, shown in the diagram corresponding to the WRITE row and STORING "1" column of FIG. 2. It is theorized that the temporary alteration of the flux $f_1$ takes the form of reversible domain reorientation under influence of a quadrature field. The clockwise field set up by the read current around aperture 11 and the counterclockwise field set up by that current around aperture 13 combine to create a force perpendicular to the remanent flux $f_1$ in legs 18 and 19 which causes the flux to be rotated somewhat as shown in the diagram corresponding to the $n$th readout of a stored 1. This reorientation decreases the apparent flux linkage around the center hole 12 and induces a voltage of predetermined polarity (arbitrarily shown as negative in FIGURE 4) in winding 25. Upon removal of the quadrature field, the flux $f_1$ assumes its original orientation. The readouts are, therefore, nondestructive.

When a binary 0 is to be stored in the element 10 an INHIBIT pulse is applied to the element via winding 23 prior to application of the WRITE pulse. It will be noted that the INHIBIT current effects the element 10 in the same manner as the READ current. The flux in vertical legs 15 and 17 is reversed as shown in the diagram corresponding to INHIBIT in FIGURE 2. A remanent flux remains in the horizontal legs 18 and 19, however, as indicated by the arrows $f_0$ in FIGURE 2.

Shortly after the INHIBIT pulse is commenced, a WRITE pulse is applied to winding 21. The write pulse attempts to switch leg 14 downwardly and leg 16 upwardly, and to reverse the direction of flux in horizontal legs 18 and 19. The opposing effect of the INHIBIT current prevents any flux change, however, and upon termination of the WRITE and INHIBIT pulses, the device remains in the previously described state. Care must be taken to limit the amplitude of the WRITE pulse to prevent its effects from overcoming the INHIBIT pulse and switching flux. Care must also be taken to terminate the WRITE pulse prior to or concurrently with termination of the INHIBIT pulse.

Comparison of the flux diagrams of FIGURE 2 will show that the flux pattern for a stored 0 after WRITE time corresponds to the flux pattern for a stored 1 following the first readout, except for the direction of the remanent flux in horizontal legs 18 and 19. The direction of flux in these legs, then, indicates the value of the stored information.

Figure 4:
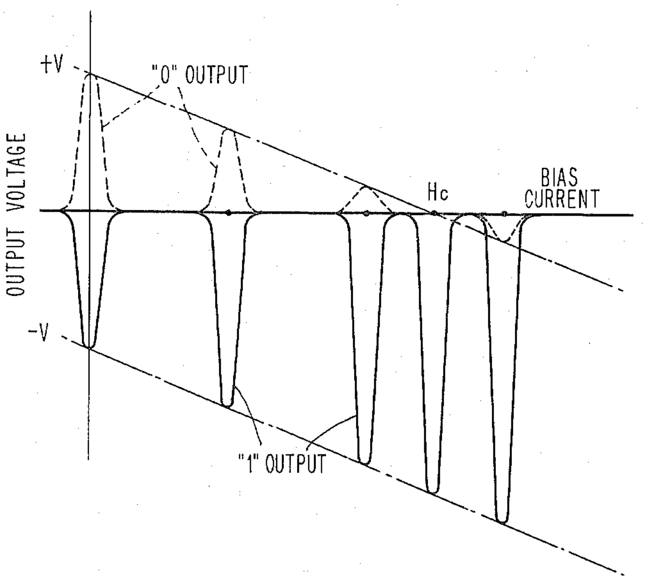
FIGURE 4 is a graph of output voltage versus bias current illustrating the effect of a bias supplied to the device in accordance with this invention.

Non-destructive readout of a stored 0 is accomplished in the same manner as a readout of a stored 1 with similar results. In the case of the stored 0, the direction of the flux $f_0$ is opposite to that of the stored 1, and the voltage induced in winding 25 upon reorientation of flux $f_0$ is, accordingly, of opposite polarity, as shown in FIGURE 4. The amplitude of this voltage is approximately the same as that of the voltage indicating for a stored 1. Discrimination between readout of a 1 or a 0 must be on the basis of polarity difference.

According to the present invention, the amplitude of the output voltage indicating a stored 1 is increased, and provision is made for discriminating between a 1 or a 0 on the basis of relative amplitude, by introducing a bias to the element 10. It has been discovered that a direct current applied upwardly (out of the paper) through the center aperture 12 has the effect of increasing the amplitude of the 1 output voltage and correspondingly decreasing the amplitude of the 0 output voltage. The bias current does not adversely affect the operation of the element 10 insofar as writing information therein is concerned. It appears that the D.C. bias establishes a counterclockwise flux about the central aperture 12 which aids the flux $f_1$ in legs 18 and 19 in the case of a stored 1, and opposes the flux $f_0$ in these legs in the case of a stored 0. The bias flux, indicated by the dotted arrows $f_b$ in the third row of diagrams of FIGURE 2, apparently increases the density of the flux $f_1$ so that upon reorientation thereof during readout of a stored 1, a larger net change occurs about the center aperture 12, and a larger voltage is induced in winding 25. The flux $f_b$ reduces the density of the flux $f_0$ so that upon readout of a stored 0, a smaller net change occurs and a correspondingly smaller output voltage is induced in winding 25. In the fourth and fifth rows of the diagram in FIG. 2, arrows $(f_1+f_b)$ and $(f_0-f_b)$ are shown. These are intended to indicate the net flux in legs 18 and 19. While the bias is applied constantly, it does not materially affect the CLEAR and INHIBIT operations; hence the flux arrows $f_b$ have been omitted from the first two rows of diagrams in FIG. 2 for the sake of clarity.

The graph of FIGURE 4 illustrates the effect of the bias current on the 1 and 0 output voltages. The horizontal coordinate of the graph represents different values of bias current (in ampere-turns) and the vertical coordinate represents output voltage amplitudes. It will be observed that for increasing values of bias current, the 1 outputs grow increasingly larger, and the 0 outputs grow increasingly smaller. It has been found that when the bias is made greater than the coercive force of the magnetic material the polarity of the 0 output is reversed. It is believed that this occurs because at this point the bias flux $f_b$ becomes larger than the remanent flux $f_0$.

The bias provided in accordance with this invention may be applied to the element 10 in any of several different ways. It has been found that the bias may be applied via the sense winding 25, as shown in FIGURE 1. One end of the winding 25 is connected through a bias resistor 27 to a positive bias source $+V_b$ and the other end of the winding 25 is returned to reference potential. Current, the amplitude of which is determined by the source voltage and impedance of resistor 27, flows through winding 25 upwardly through aperture 12 to establish and maintain the flux $f_b$. Sense amplifier 26 is fed from the end of winding 25 which is connected to resistor 27 so that it amplifies voltage signals appearing between this end of the winding 25 and reference potential. Any conventional pulse amplifier may be employed. Care should be taken, however, to insure that the bias current flowing through winding 25 does not render the amplifier operative in the absence of readout voltages. This may be prevented by proper biasing of the first amplification stage, or by use of a suitable D.C. decoupling network.

Figure 5:
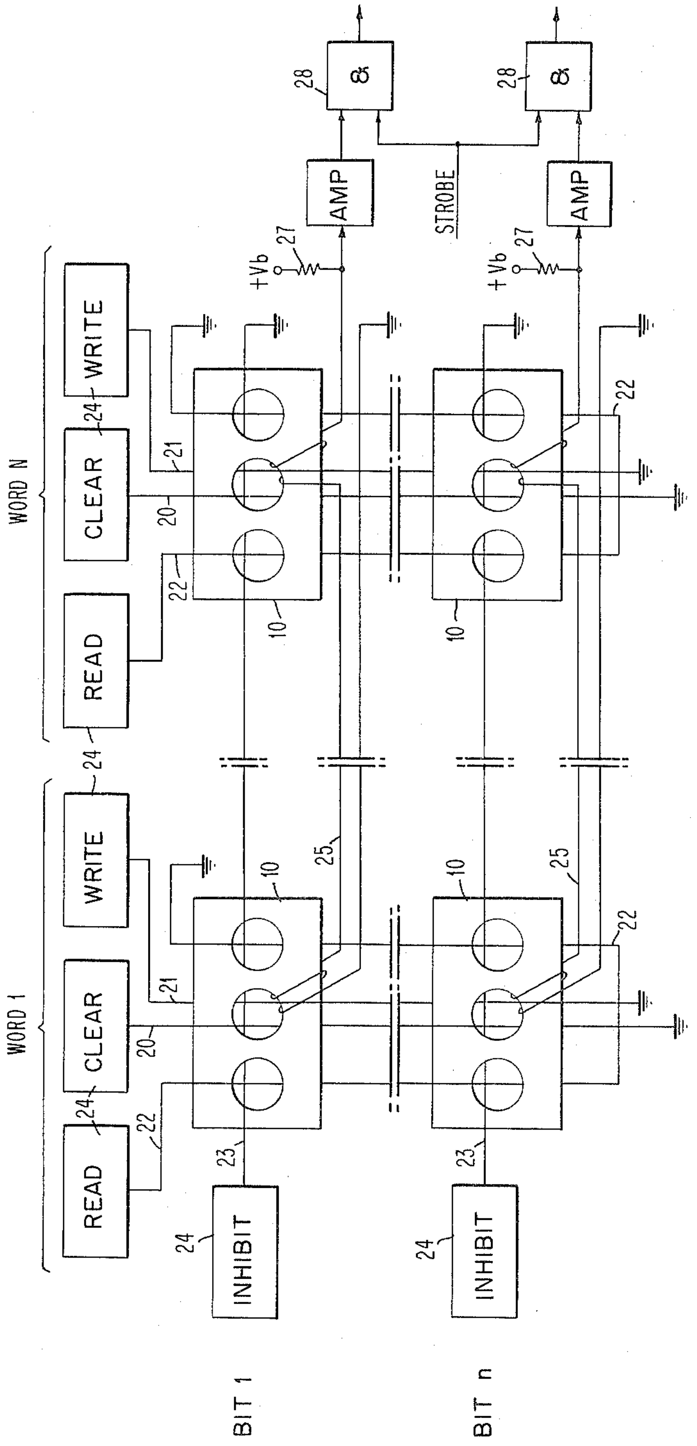
FIGURE 5 is a fragmentary schematic illustration of a memory matrix embodying the invention.

FIGURE 5 of the drawings illustrates a memory matrix employing elements 10, biased in accordance with this invention. As shown in FIGURE 5, the CLEAR windings 20, the WRITE windings 21 and the READ windings 22 of the several elements 10 are serially connected by columns to form word select lines, while the INHIBIT windings 23 and sense windings 25 are serially connected by rows to form bit input and output lines. The D.C. bias for each element 10 is supplied through the sense line coupling that element.

A binary word is written into the memory by: (1) clearing all storage elements of a selected word location through activation of the appropriate CLEAR driver, (2) activating the INHIBIT drives for those bit locations wherein a 0 is to be stored, and (3) activating the WRITE driver for the selected word to store a 1 in each uninhibited bit storage location of that word.

Readout of a selected word is accomplished by activating the READ driver corresponding to that word and sensing the voltages induced in the several bit output lines. Gates 28 are enabled during the readout period by a strobe pulse to pass the information outputs to suitable utilization circuits.

It has been found that in a memory unit such as that shown in FIGURE 5, optimum results are obtained if the bias means is adjusted to produce a significant difference in amplitude between 1 and 0 outputs but to maintain a polarity difference therebetween. In such an arrangement, the enhanced 1 output is large enough to be easily detected and to permit noise discrimination on the biases of amplitude, and the 0 signal is still of opposite polarity so that it does not add to spurious noise voltages and cause large unwanted noise signals.

Figure 6:
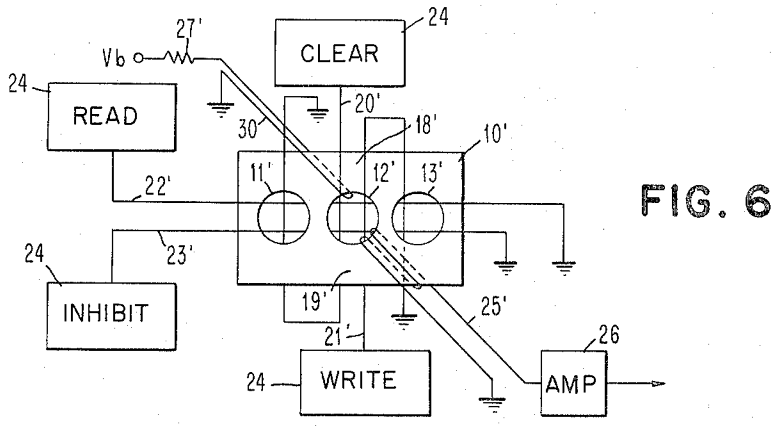
FIGURE 6 is a schematic illustration of a modified non-destructive readout embodying the present invention.

In FIGURE 6 of the drawings there is shown a modified embodiment of the invention comprising a magnetic element 10 which has input windings 20′, 21′, 22′, and 23′ coupled thereto in a somewhat different arrangement. As illustrated, the CLEAR winding 20′ passes down through aperture 12′ and then up through aperture 11′. WRITE winding 21′ passes up through aperture 12′ and then down through aperture 13′. This modified embodiment is operated in exactly the same manner and with similar results. This embodiment offers advantages in that lower amplitude currents may be employed, and somewhat faster operation is realized. The flux patterns created upon activation of the various drivers are somewhat more complex, since the CLEAR and WRITE currents are reduced in amplitude and act through more than one aperture. The details of the internal operation of element 10 is fully described in the copending application hereinbefore mentioned, and it is not believed necessary to repeat them here. Suffice it to say that the element 10′ exhibits the same non-destructive readout properties as the element 10, apparently for the same reasons. Application of current to the several windings 20′, 21′ and 23′ apparently establishes in the upper and lower horizontal legs 18′ and 19′ a remanent flux the direction of which is dependent upon whether a 1 or a 0 is being stored. Application of current to winding 22′ temporarily and reversibly alters this flux to produce an output in sense winding 25′, the polarity of which indicates the value of the stored information.

It has been found that application of a D.C. bias current through the central aperture 12′ of this element produces the same effects described with respect to the device of FIGURE 1. As in FIGURE 1, the bias may be applied via the sense winding 25′, or it may be applied via a winding 30 especially provided for that purpose, as shown in FIGURE 6. It will be understood that either of these methods of application may be employed in either embodiment. It is also contemplated that the bias may be applied through either the CLEAR winding 20 or 20′ or the WRITE winding 21 or 21′ if desired.

While the invention has been described with reference to one particular non-destructive readout magnetic element, it should be appreciated that the biasing means herein disclosed may be employed to enhance the operation of other devices which depend upon reversible reorientation of remanent flux to non-destructively indicate stored information, as well.

While the invention has been particularly shown and described with reference to preferred embodiments thereof, it will be understood by those skilled in the art that various changes in form and details may be made therein without departing from the spirit and scope of this invention.

What is claimed is:

1. A non-destructive readout magnetic element comprising a body of magnetic material exhibiting magnetic remanence, said body having first, second and third apertures therein defining together with the peripheral edges of the element four parallel legs of equal minimum cross-sectional area connected at their opposite ends by two perpendicular legs the minimum cross sectional area of each of which is at least double that of the said parallel legs, means responsive to binary information to be stored for establishing in said perpendicular legs remanent flux having one direction for a stored binary 1 and having the opposite direction for a stored binary 0, a readout winding threading the first and third apertures in said body, means for energizing said readout winding in such a manner as to cause temporary and reversible alterations of the said remanent flux in said perpendicular legs, a sense winding threading said second aperture wherein voltages are induced by said alterations, and bias means associated with said element for affecting the remanent flux in said perpendicular legs so that the voltage induced upon alteration of said flux when it has a direction representing a stored binary 1 is enhanced.

2. The invention defined in claim 1 wherein said bias means comprises a bias current supply source connected to the sense winding for passing a constant current therethrough.

3. A non-destructive readout magnetic element comprising a body of magnetic material exhibiting substantial remanence, writing means including windings coupled to said element for establishing a first magnetic flux pattern representative of one value of stored information and a second flux pattern representative of another value of stored information, an output winding coupled to the element, readout means including at least one winding coupled to said element for temporarily and reversibly altering flux in at least a predetermined portion of said element to produce an output voltage in said output winding, said first and second flux patterns being such that the output voltage induced upon alteration of the first flux pattern is of opposite polarity to that induced upon alteration of the second flux pattern, and bias means coupled to said element for affecting the flux pattern in the element to enhance the output voltage induced upon alteration of the first flux pattern and to reduce the output voltage induced upon alteration of the second flux pattern, said bias means including a bias current source connected to the output winding on said element for passing a constant current therethrough to affect the flux pattern in the element.

References Cited by the Examiner

UNITED STATES PATENTS

| | | | |
|---|---|---|---|
| 2,696,347 | 12/54 | Lo | 340—166 |
| 2,923,923 | 2/60 | Raker | 340—174 |
| 3,023,400 | 2/62 | Booth | 340—174 |

IRVING L. SRAGOW, *Primary Examiner.*

JOHN F. BURNS, *Examiner.*